(12) United States Patent
Machida

(10) Patent No.: US 7,710,398 B2
(45) Date of Patent: May 4, 2010

(54) COMPUTER MOUSE HAVING ROTATABLE DETECTION

(75) Inventor: Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1075 days.

(21) Appl. No.: 11/387,612

(22) Filed: Mar. 23, 2006

(65) Prior Publication Data
US 2007/0222751 A1   Sep. 27, 2007

(51) Int. Cl.
*G09G 5/08* (2006.01)
(52) U.S. Cl. ...................................... 345/163
(58) Field of Classification Search ......... 345/156–184; 178/18.01–19.03
See application file for complete search history.

(56) References Cited

U.S. PATENT DOCUMENTS

| | | | |
|---|---|---|---|
| 5,528,265 A * | 6/1996 | Harrison | 345/158 |
| 7,336,258 B1 * | 2/2008 | Goetsch et al. | 345/163 |
| 2003/0076303 A1 | 4/2003 | Huppi | |
| 2006/0044274 A1 * | 3/2006 | Numazawa et al. | 345/163 |
| 2006/0176273 A1 * | 8/2006 | Wolfe | 345/156 |

* cited by examiner

*Primary Examiner*—Chanh Nguyen
*Assistant Examiner*—Tsegaye Seyoum

(57) ABSTRACT

A computer mouse having rotational detectability is disclosed. The mouse has an outer housing adapted for directional movement on a horizontal plane. The mouse includes the conventional left and right buttons and scroll wheel. Additionally, the mouse includes an extendable plunger which, when extended, prohibits movement of the mouse in x-y directions yet permits rotational movement about the plunger. A sensor is included proximate the plunger for measuring rotational movement of the mouse about the plunger in the horizontal plane.

11 Claims, 3 Drawing Sheets

COMPUTER MOUSE HAVING ROTATABLE DETECTION

TECHNICAL FIELD

The present application relates generally to a user-input device for a computer system. More particularly, the present application relates to a computer mouse having the ability to detect rotational movement.

BACKGROUND OF THE INVENTION

Most computer systems, for example general purpose computers such as portable computers and desktop computers, receive input from a user or user-input device such as a mouse. A mouse allows a user to move an input-pointer, also known as a cursor, to a particular location on a monitor and make a selection in a graphical user interface mode. A conventional mouse includes left and right buttons, as well as a scroll dial.

BRIEF SUMMARY OF THE INVENTION

One embodiment of the present invention is directed to an improved computer mouse having the ability to perform rotational movement of the cursor. The mouse or computer-operated input device comprises a housing which is moveable by the user in the traditional x-y directions along a base plane. A plunger is supported within the housing and oriented substantially normal to the base plane. Normally, the plunger is in a retracted position and in that mode operates as a conventional mouse, but when the plunger is depressed or extended it permits rotational movement of the housing about the longitudinal axis of the plunger and hence the cursor on the monitor without requiring movement of the housing in the x-y directions of the base plane.

Another embodiment allows the mouse to detect a simple rotational movement about the center line of the mouse. A further embodiment allows the user to be able to rotate the cursor and point it in a different orientation without moving the mouse in an x-y plane.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURES. It is to be expressly understood, however, that each of the FIGURES is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
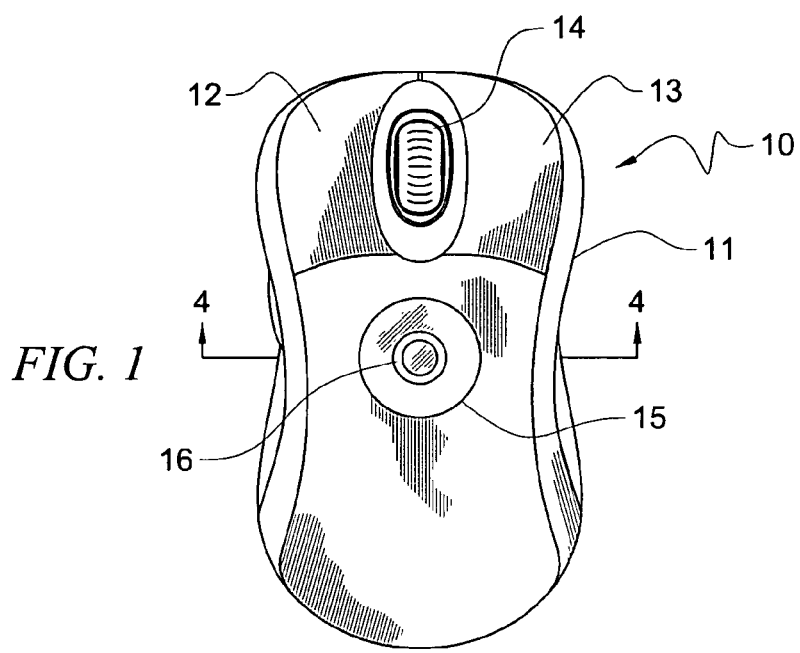
FIG. 1 is a top plan view of an embodiment of the present invention.
Figure 2A:
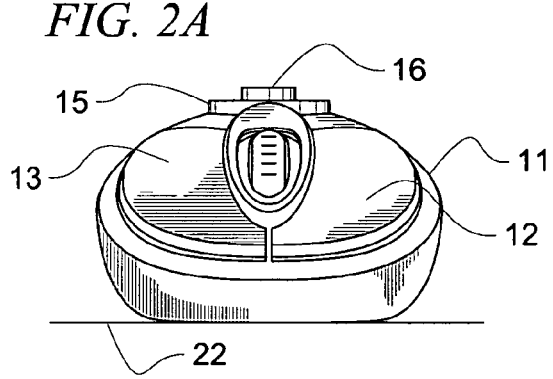
FIGS. 2A-2B are side views of the embodiment of FIG. 1 in different operational modes.
Figure 2B:
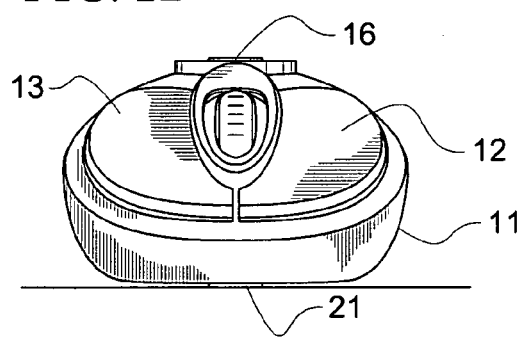

Referring now to FIGS. 1 and 2A-2B, mouse 10 comprises outer housing 11. Since FIG. 1 is a top plan view, the top portion of housing 11 is illustrated. Mouse 10 includes a left button 12, a right button 13, and a scroll dial 14. Left button 13, right button 13, and scroll dial 14 perform in a conventional manner.

Figure 4:
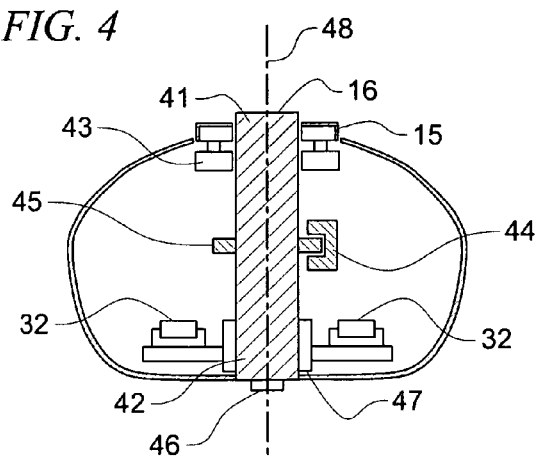
FIG. 4 is a cross-sectional view of the embodiment of FIG. 1 taken along line 4-4 of FIG. 1.

Mouse 10 includes plunger 16, which extends through the top of housing 11. Referring to FIG. 4, plunger 16 extends through housing 11, and when depressed as shown in FIG. 2B, end 21 of plunger 16 extends out the bottom of housing 11. A ring button 15 circumscribes the top of plunger 16.

Figure 3:
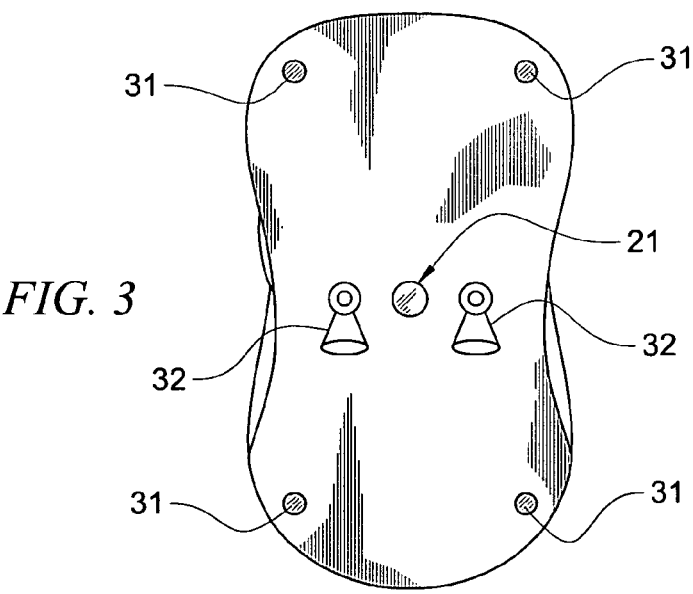
FIG. 3 is a bottom plan view of the embodiment of FIG. 1.

Referring to FIG. 3, the bottom of housing 11 may include bearings 31 which facilitate the directional moving of housing 11 in an x-y direction along a horizontal or base plane 22, as shown in FIGS. 2A and 2B. Referring still to FIG. 3, sensors 32 and 33 are preferably positioned a predetermined distance, r, on opposite sides of end 21 of plunger 16. Such sensors may comprise conventional sensors and ma include optical scanning capabilities.

Referring now to FIG. 4, plunger 16 is supported within housing 11 and includes top portion 41 and bottom portion 42. Top portion 41 extends to the top of housing 11 permitting the user to depress plunger 16 as needed. Ring button 15 is in communication with switch 43 which operates a particular function upon engagement of plunger 16 with base plane 22 as discussed in more detail below. Plunger 16 is supported within housing 11 using conventional means. The stroke of plunger 16 is limited by interpreter 44 which engages ring 45 fixed around plunger 16. In this manner, plunger 16 is laterally restrained by ring 45 and bearings 47 at the bottom portion 42, and has limited vertical stroke. Furthermore, bottom portion 42 of plunger 16 may include rubber tip 46 which engages the table or other support representing base plane 22.

In the operation of the present invention, the user depresses top portion 41 of plunger 16. Such an action depresses rubber tip 46 against base plane 22. In this manner, the directional movement of mouse 10 in an x-y direction on base plane 22 is limited, preferably prohibited. At that point, the user may rotate mouse 10 about longitudinal axis 48 of plunger 16.

Figure 5A:
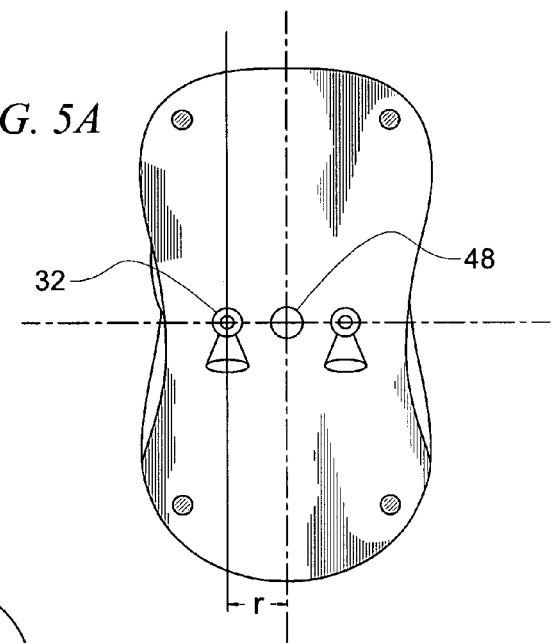
FIGS. 5A-5B are schematics of the bottom view of an embodiment of the present invention demonstrating positioning of the sensors and the rotation plunger.
Figure 5B:
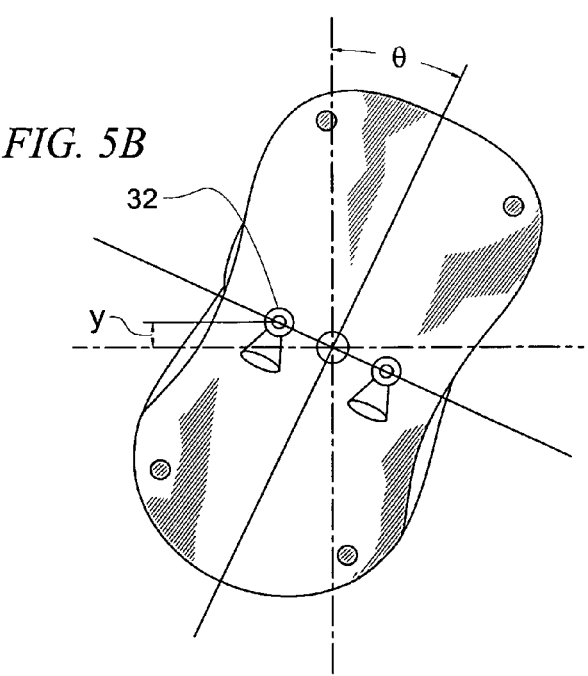

Referring to FIGS. 5A and 5B, such rotation about axis 48 results in the vertical movement "y" of sensor 32 (see FIG. 5B). In this manner, the angular movement, θ, can be calculated as:

$$\theta = (\gamma/2\pi r) \times 360°$$

At that time, the user may depress ring button 15 to activate a particular function. For example, the present invention may be particularly useful in a video game which requires that the operator orient a particular object such as gun, a rifle or canon, and then fire the virtual firearm by depressing ring button 15.

Figure 6A:
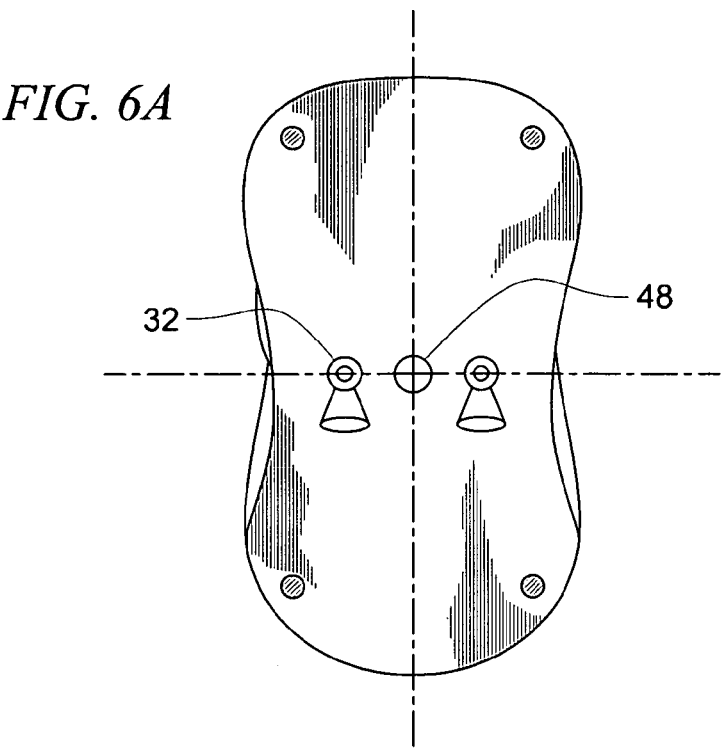
FIGS. 6A-6B are schematics of an embodiment of the present invention demonstrating combined rotational and directional movement.
Figure 6B:
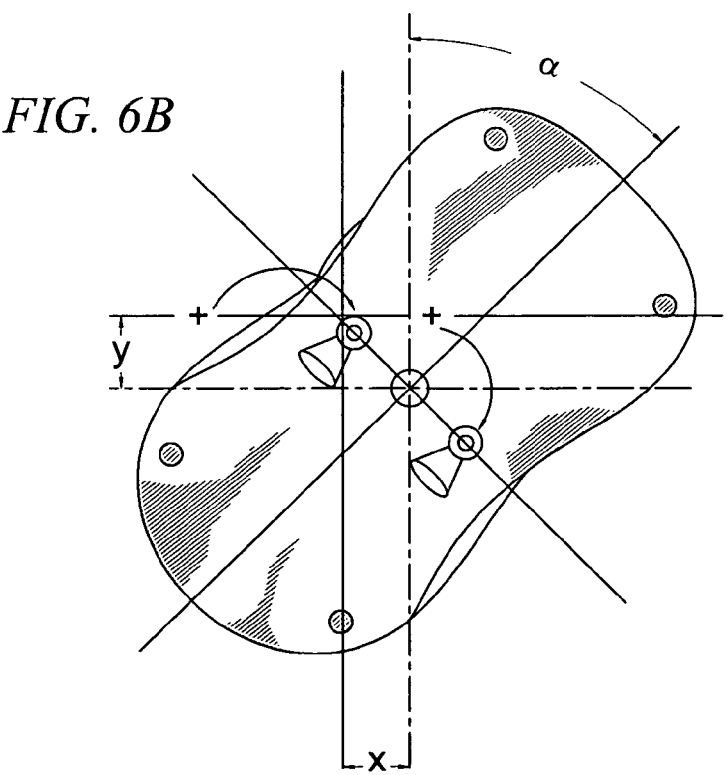

Referring now to FIGS. 6A and 6B, it may be beneficial for the operator to move the mouse of the present invention in both a rotational movement and an x-y directional movement on base plane 22. Such a movement is illustrated by comparing FIG. 6B to FIG. 6A. For example, as illustrated, axis 48 has been moved a positive "x" distance and a negative "y" distance. Under these circumstances, α may be calculated as follows:

$$\alpha = \tan^{-1}(x/y)$$

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A user-operated input device comprising:
   a housing adapted for directional movement in a base plane; and
   a plunger supported within the housing and capable of permitting rotational movement of said housing in said base plane about said plunger, said plunger having an upper end and a lower end,
   wherein said plunger extends through said housing to expose said upper end of said plunger at the top of said housing such that said plunger is extended out of the bottom of said housing when said upper end of said plunger is depressed from the top of said housing.

2. The input device of claim 1 wherein said plunger is supported within said housing and oriented substantially normal to said base plane.

3. The input device of claim 2 wherein said plunger advances from a retracted position within said housing permitting said directional movement in said base plane to an extended position, wherein said lower end extends to said base plane preventing directional movement of said housing in said base plane yet permitting said rotational movement.

4. The input device of claim 1 further comprising:
   a control switch supported within said housing; and
   means for engaging said control switch supported at the outer surface of said housing,
   wherein the user may initiate a control action, via the control switch, following commencement of said rotational movement of said housing.

5. The input device of claim 3 further comprising:
   means for sensing the amount of rotational movement of said housing about said plunger.

6. The input device of claim 5 wherein said sensing means comprises:
   at least one sensor positioned a pre-determined distance from said plunger for sensing angular displacement of said at least one sensor of said housing within said base plane.

7. The input device of claim 5 wherein said sensing means comprises:
   at least two sensors having optical scanning capabilities, each positioned a pre-determined distance from said plunger so as to measure the angular displacement of said housing relative to said base plane during said rotational movement.

8. A computer mouse comprising:
   a housing moveable by user and having a base adapted for directional movement in a first plane; and
   an extendable plunger passing through, and supported by, said housing, said plunger being oriented along an axis substantially normal to said first plane, said plunger having an upper end and a lower end being adapted to extend from a retracted position to an extended position wherein said lower end of said plunger extends to said first plane permitting rotational movement of the mouse about said axis by the user in the extended position,
   wherein said plunger extends through said housing to expose said upper end of said plunger at the top of said housing such that said plunger is extended out of the bottom of said housing when said upper end of said plunger is depressed from the top of said housing.

9. A computer mouse of claim 8 further comprising:
   means for sensing the amount of rotational movement of said mouse about said axis.

10. A computer mouse of claim 9 wherein the sensing means comprises:
    at least one sensor positioned a pre-determined distance from said axis so as to measure the angular displacement of said mouse about said axis within said first plane.

11. A computer mouse of claim 9 wherein said sensing means comprises:
    two sensors having optical scanning capabilities positioned within said housing approximate said base and each such sensor positioned a pre-determined distance from said axis so as to measure the angular displacement of said mouse about said axis within said first plane.

* * * * *